United States Patent
Chien et al.

(10) Patent No.: US 11,216,729 B2
(45) Date of Patent: Jan. 4, 2022

(54) RECOGNITION SYSTEM AND RECOGNITION METHOD

(71) Applicant: Nuvoton Technology Corporation, Hsinchu (TW)

(72) Inventors: Woan-Shiuan Chien, New Taipei (TW); Tzu-Lan Shen, Taoyuan (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 138 days.

(21) Appl. No.: 16/689,435

(22) Filed: Nov. 20, 2019

(65) Prior Publication Data
US 2020/0160179 A1    May 21, 2020

(30) Foreign Application Priority Data
Nov. 20, 2018   (TW) ................ 10714117.1

(51) Int. Cl.
| | |
|---|---|
| G06K 9/62 | (2006.01) |
| G06N 3/08 | (2006.01) |
| G06K 9/46 | (2006.01) |
| G06N 3/04 | (2006.01) |
| G10L 15/02 | (2006.01) |
| G10L 15/22 | (2006.01) |
| G10L 15/16 | (2006.01) |
| G10L 25/24 | (2013.01) |
| G10L 15/06 | (2013.01) |

(52) U.S. Cl.
CPC .............. *G06N 3/08* (2013.01); *G06K 9/46* (2013.01); *G06K 9/6232* (2013.01); *G06K 9/6256* (2013.01); *G06K 9/6262* (2013.01); *G06N 3/04* (2013.01); *G10L 15/02* (2013.01); *G10L 15/063* (2013.01); *G10L 15/16* (2013.01); *G10L 15/22* (2013.01); *G10L 25/24* (2013.01)

(58) Field of Classification Search
CPC ........... G06N 3/08; G06N 3/04; G06N 3/084; G06N 3/0454; G06K 9/46; G06K 9/6256; G06K 9/6262; G06K 9/6232; G06K 9/6271; G06K 9/00664; G10L 15/02; G10L 15/22; G10L 15/16; G10L 25/24; G10L 15/063; G10L 25/03; G10L 25/30
USPC ....................................................... 382/157
See application file for complete search history.

(56) References Cited

U.S. PATENT DOCUMENTS

| | | |
|---|---|---|
| 8,442,820 B2 | 5/2013 | Kim et al. |
| 2017/0148430 A1* | 5/2017 | Lee .................. G10L 15/16 |

* cited by examiner

*Primary Examiner* — Charlotte M Baker
(74) *Attorney, Agent, or Firm* — Muncy, Geissler, Olds and Lowe, P.C.

(57) ABSTRACT

A recognition method includes: receiving a training voice or a training image; and extracting a plurality of voice features in the training voice, or extracting a plurality of image features in the training image; wherein when extracting the voice features, a specific number of voice parameters are generated according to the voice features, and the voice parameters are input into a deep neural network (DNN) to generate a recognition model. When extracting the image features, the specific number of image parameters are generated according to the image features, and the image parameters are input into the deep neural network to generate the recognition model.

12 Claims, 3 Drawing Sheets

RECOGNITION SYSTEM AND RECOGNITION METHOD

CROSS REFERENCE TO RELATED APPLICATIONS

This Application claims priority of Taiwan Patent Application No. 107141171, filed on Nov. 20, 2018, the entirety of which is incorporated by reference herein.

BACKGROUND OF THE INVENTION

Field of the Invention

The present disclosure relates to a recognition system and a recognition method, and in particular, to a recognition system and a recognition method for recognizing a voice or image.

Description of the Related Art

In general, Hidden Markov Models (HMM) can be used to identify images or voices. This algorithm establishes a statistical model of the identified word by statistically analyzing a large amount of voice data and image data. Then, the algorithm extracts features from voice data and image data to be identified separately, and compare the features with multiple parameters in the statistical model to obtain multiple candidate results and their corresponding matching scores. Also, the algorithm selects the candidate result corresponding to the higher matching score as the identification result.

However, if this algorithm is to identify both images and/or voices, the statistical model used should be divided into two systems. More storage space is required. Also, it is impossible to identify images and voices with a single statistical model according to conventional HMM.

BRIEF SUMMARY OF THE INVENTION

In accordance with one feature of the present invention, the present disclosure provides a recognition system that includes a voice receiving device, a camera and first processor. The voice receiving device is configured to receive a training voice. The camera, configured to receive a training image. The first processor is configured to extract a plurality of voice features in the training voice, or extract a plurality of image features in the training image. When the first processor extracts the voice features, the first processor generates a specific number of voice parameters according to the voice features, and the voice parameters are input into a deep neural network (DNN) to generate a recognition model. When the first processor extracts the image features, the first processor generates the specific number of image parameters according to the image features, and the image parameters are input into the deep neural network to generate the recognition model.

In accordance with one feature of the present invention, the present disclosure provides a recognition method. The recognition method includes receiving a training voice or a training image; and extracting a plurality of voice features in the training voice, or extracting a plurality of image features in the training image; wherein when extracting the voice features, generating a specific number of voice parameters according to the voice features, and the voice parameters are input into a deep neural network (DNN) to generate a recognition model; wherein when extracting the image features, generating the specific number of image parameters according to the image features, and the image parameters are input into the deep neural network to generate the recognition model.

With the recognition system and the recognition method described in the present case, it is possible to receive training voices or training images during the stage of training the recognition model. The recognition system and the recognition method convert the extracted voice features or image features into a one-dimensional feature set (for example, a number series) and substitute the one-dimensional feature set into the deep neural network to generate a recognition model. Only one recognition system is needed to generate the recognition results for voice, image or both. The recognition system and recognition method can greatly reduce the amount of calculation by the reduction operation. Also, when training the recognition model with training voices and training images at the same time, the accuracy of the recognition model in predicting new data can be improved. Therefore, it improves the accuracy of prediction the type of new data.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1A:
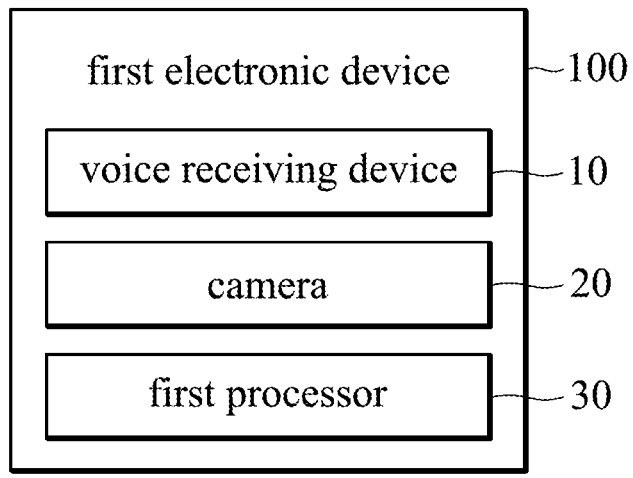
FIG. 1A is a block diagram of a recognition system in accordance with one embodiment of the present disclosure.
Figure 1B:
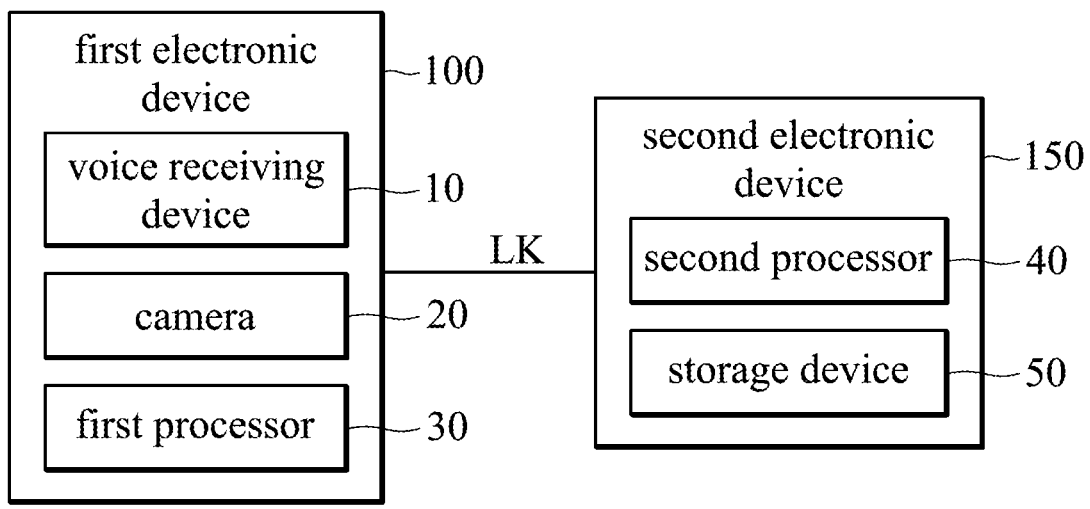
FIG. 1B is a block diagram of a recognition system in accordance with one embodiment of the present disclosure.
Figure 2:
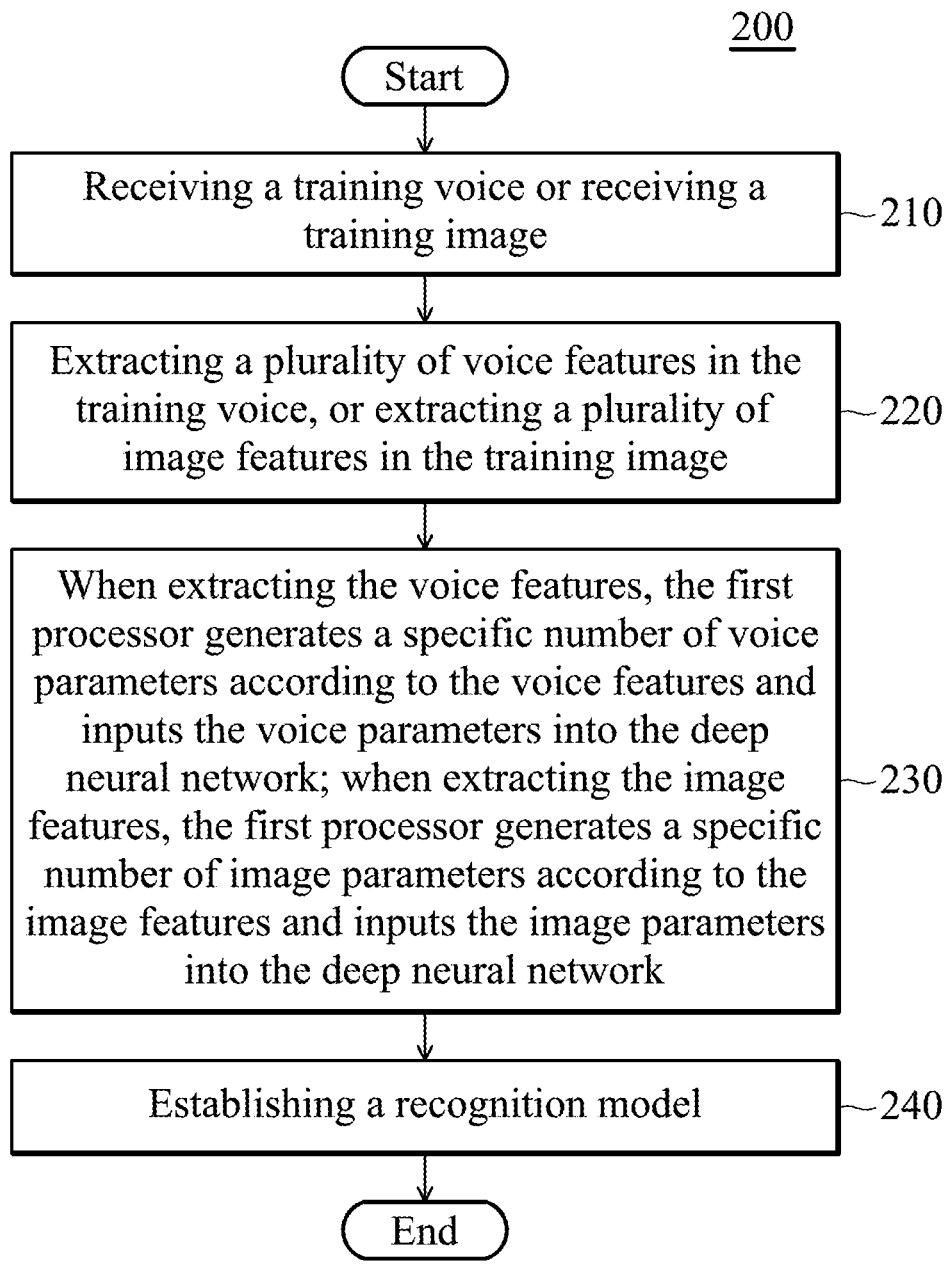
FIG. 2 is a flow diagram of a recognition method in accordance with one embodiment of the present disclosure.

Refer to FIGS. 1A-1B and 2. FIG. 1A is a block diagram of a recognition system in accordance with one embodiment of the present disclosure. FIG. 1B is a block diagram of a recognition system in accordance with one embodiment of the present disclosure. FIG. 2 is a flow diagram of a recognition method 200 in accordance with one embodiment of the present disclosure.

As shown in FIG. 1A, the recognition system includes a first electronic device 100. The first electronic device 100 includes a voice receiving device 10, a camera 20, and a first processor 30. In one embodiment, the first electronic device 100 can be, for example, a desktop computer, a notebook computer or other device with computing function. In one embodiment, the first electronic device 100 can be a server in the cloud system or a remote server.

In one embodiment, the voice receiving device 10 can be a microphone or an electronic device with voice receiving device.

In one embodiment, the camera 20 may be composed of at least one charge coupled device (CCD) or a complementary metal-oxide semiconductor (CMOS) sensor.

In one embodiment, the first processor 30 can be implemented by using an integrated circuit, such as a microcontroller, a microprocessor, a digital signal processor, an application specific integrated circuit (ASIC), or a logic circuit.

In one embodiment, the recognition system further includes a storage device (not shown) for storing the calculation result of the first processor 30. The storage device can be implemented as a read-only memory, a flash memory, a floppy disk, a hard disk, a compact disk, a flash drive, a tape, a network accessible database, or as a storage medium that can be easily considered by those skilled in the art to have the same function.

In FIG. 1B, the recognition system further includes a second electronic device 150. The first electronic device 100 is coupled to the second electronic device 150 by a communication link LK (for example, wireless network, wired network or other communication method) for transmitting message. In one embodiment, the second electronic device 150 includes a second processor 40 and a storage device 50. In one embodiment, the second electronic device 150 can be, for example, a voice box or other electronic device that can receive voice or image.

In one embodiment, the second processor 40 can be implemented by using an integrated circuit, such as a microcontroller, a microprocessor, a digital signal processor, an application specific integrated circuit (ASIC), or a logic circuit. In one embodiment, the computing ability of the first processor 30 is higher than that of the second processor 40

In one embodiment, the storage device 50 can be implemented as a read-only memory, a flash memory, a floppy disk, a hard disk, a compact disk, a flash drive, a tape, a network accessible database, or as a storage medium that can be easily considered by those skilled in the art to have the same function.

Please refer to FIG. 2, which describes the flow of the recognition method 200 of the present disclosure. The hardware mentioned in the recognition method 200 can be implemented by the corresponding hardware in the FIG. 1A or FIG. 1B.

In step 210, a voice receiving device 10 receives a training voice or a camera 20 receives a training image. For example, the training voice received by the voice receiving device 10 is a "zero" pronunciation and/or the camera 20 captures a training image including a "0" pattern.

In one embodiment, the first electronic device 100 can receive one or more training image(s) (for example, input a set of training images with "0" to "9" patterns in sequence) and/or one or more training voice(s) (for example, input a set of training voices with the pronunciation of "zero" to "nine" in sequence) simultaneously or sequentially. In the subsequent steps, only one training image or one training voice is processed firstly. For example, first, the training voice pronounced as "zero" and/or the training image "0" are/is passed to the first processor 30 to perform step 220. Also, then the other training images and/or training voices are sequentially processed in the same step (for example, the training voice pronunciation as "one" and/or the training image "1" are/is passed to the first processor 30 to perform the next step 220).

In one embodiment, the first electronic device 100 only needs to receive a training voice or a training image to perform subsequent steps, and the first electronic device 100 does not need to receive both the training voice and the training image.

In step 220, the first process 30 extracts a plurality of voice features in the training voice, or extracts a plurality of image features in the training image. In an embodiment, when the first processor 30 receives the training voice, a plurality of voice features are extracted from the training voice, and when the first processor 30 receives the training image, the plurality of image features are extracted from the training image. When the first processor 30 receives the training image and the training voice, the image feature and the voice feature are extracted in the same order in which they were received.

In one embodiment, the first processor 30 performs a Mel-scale Frequency Cepstral Coefficients (MFCC) algorithm to extract such voice features in the training voice. However, the present invention is not limited to apply the Mel cepstral coefficient algorithm, and other algorithms for extracting voice features may be employed according to the actual implementation of the system.

In one embodiment, the first processor 30 analyzes each pixel in the training image to obtain such image features. For example, the first processor 30 can acquire the pixel values of each point in the training image, and treat each pixel value as an image feature. However, the present invention is not limited thereto, and other algorithms for extracting image features may be employed according to the actual implementation of the system.

In step 230, when the first processor 30 extracts the voice features, the first processor 30 generates a specific number of voice parameters according to the voice features. The first processor 30 loads the program of the deep neural network (DNN). The voice parameters are input into the deep neural network. Also, the first processor 30 performs the program of the deep neural network algorithm. Since deep neural networks are known technologies, it is an algorithm that allows the computer to analyze the data by itself to find the feature value. Therefore, the deep neural network is not further described here. When the first processor 30 extracts the image features, the first processor 30 generates the specific number of image parameters according to the image features. The image parameters are input into the deep neural network.

In one embodiment, after the first processor 30 extracts the voice features, the first processor 30 generates a specific number of voice parameters (for example, 250 voice parameters) according to the voice features. Also, the voice parameters are presented in a one-dimensional feature set.

In one embodiment, after the first processor 30 extracts the image features, the first processor 30 performs a reduction operation on the image features to generate the specific number of image parameters (for example, 250 image parameters), and the image parameters are presented in a one-dimensional feature set.

In one embodiment, regardless of whether the first processor 30 processes the voice feature or the image feature, the number of voice parameters or image parameters output by the first processor 30 is a preset specific number (for example, 250). The specific number of settings is not limited thereto, and it can be, for example, 300, 500, or 1000, and can be adjusted according to the system implementation.

In one embodiment, when the first processor 30 processes the image features, the reduction calculation is performed to divide all the pixels in the image into a plurality of groups (for example, the original image is 28*28, that is, 784 pixels, and each of the three pixels are grouped together, and extra pixels that cannot be a group are self-contained). Also, the first processor 30 takes one of the intermediate values in each group as one of the image parameters (for example, if the pixel value in a certain group is 100, 150, or 200, then taking the pixel value 150 as one of the image parameters, discarding 100 and 200 of these two pixel values). Or, the first processor 30 calculates the average pixel value of each group as one of the image parameters (for example, if the pixel value in a certain group is 100, 150, or 200, the three pixel values are averaged to obtain an average value of 150, and the pixel value 150 is taken as one of the image parameters). In this way, the number of image features can be reduced to obtain the required number of image parameters (for example, the specific number can be set to 262 in this example). The image parameters are presented in a one-dimensional feature set (for example, in a series). The first processor 30 substitutes the image parameters into the deep neural network in a one-dimensional feature set, and the first processor 30 executes an algorithm program of the deep neural network.

The method of reducing and subtracting is not limited thereto, and may be adjusted according to the implementation of the system. In addition, the voice feature can also be reduced, and the method is similar to the reduction operation of the image feature, so it will not be described here.

In step 240, the first processor 30 applies a deep neural network to establish a recognition model. Since the deep neural network is a known technology, the recognition method 200 only applies the deep neural network to establish the recognition model. Therefore, it is not further described here.

In one embodiment, when the first processor 30 processes the voice parameters, the first processor 30 inputs the voice parameters and a training answer (for example, the pronunciation of the answer is "zero") into the deep neural network, and the algorithm program of the deep neural network is executed to generate the recognition model.

In an embodiment, when the first processor 30 processes the image parameters, the image parameters and the training answer (for example, the image with the answer is "0") are input into the deep neural network to generate the recognition model.

In one embodiment, the foregoing steps 210-240 can be repeated to train the recognition model to improve the recognition rate of the recognition model. After the training is completed, the first processor 30 transmits the recognition model to the second electronic device 150 through the communication link LK. The second electronic device 150 can store the recognition model in the storage device 50. Then, the second processor 40 is configured to extract a plurality of new features of a newly added data (for example, the user speaks a new voice "zero" and/or handwritten a new image "0"). Also, the second processor 40 selects a certain number of newly added features as a plurality of new parameters (for example, 250) and substitutes the new parameters into the recognition model in the second electronic device 150 to identify the newly added data and produces a prediction result (for example, the prediction result is: the user speaks "zero" or the user provides an image containing "0").

In one embodiment, in the step of selecting a specific number of new features as a plurality of new parameters, the specific number described herein is the same as the specific number described in step 230 (for example, both are set to 250). Therefore, the recognition model can predict the type of new data (i.e., producing prediction results) without modifying the architecture.

In one embodiment, the second processor 40 (e.g., a microprocessor in a voice box) has less computing ability than the first processor 30 (e.g., a processor in a server). Through the above steps, the first processor 30 can receive a large amount of training data (such as training voices or training images) and perform a large number of operations to complete the training of the recognition model. Also, the first processor 30 transmits the recognition model that completes the training to the second electronic device 150, so that the second processor 40 directly applies the recognition model for recognition after receiving the new data. As such, the amount of computation required by the second processor 40 is greatly reduced.

In other words, the first processor 30 can convert the training data into a one-dimensional feature set according to the type of training materials (such as training voices and/or training images), and the one-dimensional feature set includes the specific number of parameters. For example, the one-dimensional feature set contains 250 voice parameters, and the other one-dimensional feature set includes 250 image parameters. The number of parameters in these one-dimensional feature sets is the same. Since the number of image parameters and voice parameters are the same, regardless of the input image parameters or voice parameters, for deep neural networks, the deep neural network receives 250 values. It is not necessary to consider the 250 values as image parameters or voice parameters to perform calculations. Therefore, the present invention can achieve the effect of receiving and identifying more than two training materials (such as training voices or training images) on the same recognition system.

It can be seen whether the recognition system receives the training voice or the training image, the voice feature or the image feature extracted can be converted into a one-dimensional feature set (for example, a number series). The recognition system substitutes this one-dimensional feature set into the deep neural network to generate a recognition model. Therefore, one recognition system is needed to generate recognition results for voice, image or both.

Figure 3:
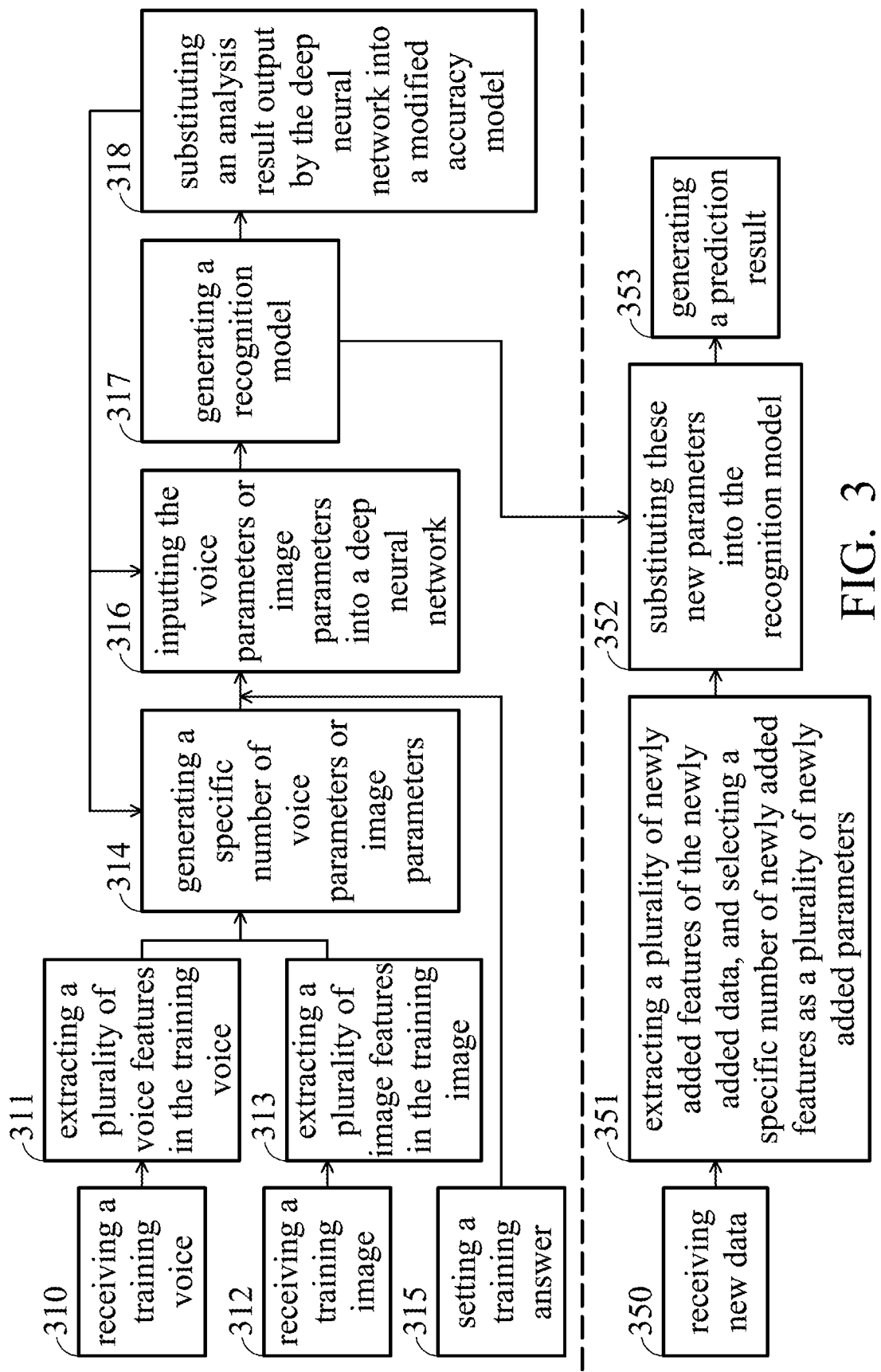
FIG. 3 is a recognition method in accordance with one embodiment of the present disclosure.

Please refer to FIG. 3 which is a recognition method in accordance with one embodiment of the present disclosure. Steps 310-318 are performed by the first electronic device 100, and steps 350-353 are performed by the second electronic device 150. In one embodiment, steps 310-318 are the training stages of the recognition model, by inputting a large amount of training data (training voices and/or training images) to generate a recognition model whose recognition rate is higher than an accuracy threshold (for example, an accuracy rate of 98%). Steps 350-353 apply the recognition models to predict the type to which new data belongs (e.g., an image of handwritten "0" is predicted to be a number "0").

In step 310, the voice receiving device 10 receives a training voice.

In step 311, the first processor 30 extracts a plurality of voice features in the training voice.

In step 312, the camera 20 receives a training image.

In step 313, the first processor 30 extracts a plurality of image features in the training image.

In one embodiment, when the recognition system receives the training voice and the training image at the same time, the execution order of steps 310-311 and steps 312-313 can be interchanged. In one embodiment, the first processor 30 performs only one of steps 310-311 or steps 312-313, depending on whether the user inputs training voices or training images.

In step 314, the first processor 30 generates a specific number of voice parameters or image parameters. The manner in which the voice parameters and/or image parameters are generated is as described in the corresponding paragraph of step 230 in FIG. 2, and therefore will not be described again here.

In step 315, the first processor 30 sets a training answer. For example, when the training voice is a pronunciation corresponding to "zero", the first processor 30 sets the training answer of the training voice to a pronunciation of "zero", and/or when the training image is an image of "0", the first processor 30 sets the training answer of the training image to an image of "0".

In step 316, the first processor 30 inputs the voice parameters or image parameters into a deep neural network and executes an algorithm program of the deep neural network. The details of this step are as described in the corresponding paragraphs in step 230 of FIG. 2, and therefore will not be described again here.

In step 317, the first processor 30 generates a recognition model.

In step 318, the first processor 30 substitutes an analysis result output by the deep neural network into a modified accuracy model, so as to determine whether a recognition rate corresponding to the analysis result output by the deep neural network is greater than an accuracy threshold. If the first processor 30 determines that the recognition rate corresponding to an analysis result output by the deep neural network is not greater than the accuracy threshold, a gradient descent algorithm is applied to correct a weight value and an offset value in the recognition model. For example, the first processor 30 determines that the recognition rate corresponding to an analysis result output by the deep neural network is 60%, and if it is not more than 98% of the accuracy threshold, the gradient descent algorithm is applied to correct a weight value and an offset value in the recognition model. Also, applying the gradient descent algorithm to adjust the weight value and the bias value in the deep neural network is a known technique in the art, so it will not be described here. In addition, it is not limited to apply the gradient descent algorithm, any algorithm that can adjust the recognition rate of deep neural network can be considered in the recognition system.

The modified accuracy model includes a plurality of array parameters and functions, which can use known modified accuracy models, so it is not described here.

In one embodiment, the first processor 30 can input different or the same training data (such as training voices and/or training images) by performing steps 310-318 multiple times during the stage of training the recognition model to improve the accuracy of the recognition model.

In one embodiment, the first processor 30 can store the recognition model in the first electronic device 100.

Next, the first processor 30 transmits the recognition model to the second processor 40.

In step 350, the second processor 40 receives new data.

In step 351, the second processor 40 extracts a plurality of newly added features of the newly added data, and selects a specific number of newly added features as a plurality of newly added parameters.

In step 352, the second processor 40 substitutes these new parameters into the recognition model.

In step 353, the second processor 40 generates a prediction result.

With the recognition system and the recognition method described in the present case, it is possible to receive training voices or training images during the stage of training the recognition model. The recognition system and the recognition method convert the extracted voice features or image features into a one-dimensional feature set (for example, a number series) and substitute the one-dimensional feature set into the deep neural network to generate a recognition model. Only one recognition system is needed to generate the recognition results for voice, image or both. The recognition system and recognition method can greatly reduce the amount of calculation by the reduction operation. Also, when training the recognition model with training voices and training images at the same time, the accuracy of the recognition model in predicting new data can be improved. Therefore, it improves the accuracy of prediction the type of new data.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A recognition system, comprising:
   a voice receiving device, configured to receive a training voice;
   a camera, configured to receive a training image;
   a first processor, configured to extract a plurality of voice features in the training voice, or extract a plurality of image features in the training image;
   wherein when the first processor extracts the voice features, the first processor generates a specific number of voice parameters according to the voice features, and the voice parameters are input into a deep neural network (DNN) to generate a recognition model;
   wherein when the first processor extracts the image features, the first processor generates the specific number of image parameters according to the image features, and the image parameters are input into the deep neural network to generate the recognition model; and
   a second processor, configured to extract a plurality of newly added features of the newly added data, select the specific number of newly added features as a plurality of new parameters, and substitute the new parameters into the recognition model to recognize the new data and generate a prediction result.

2. The recognition system of claim 1, wherein the first processor determines whether a recognition rate corresponding to an analysis result output by the deep neural network is greater than an accuracy threshold, if the first processor determines that the recognition rate corresponding to an analysis result output by the deep neural network is not greater than the accuracy threshold, a gradient descent algorithm is applied to correct a weight value and an offset value in the recognition model.

3. The recognition system of claim 1, wherein the first processor performs a Mel-scale Frequency Cepstral Coefficients (MFCC) algorithm to extract the voice features in the training voice, generates the specific number of voice parameters according to the voice features, and presents the voice parameters in a one-dimensional feature set.

4. The recognition system of claim 1, wherein the first processor analyzes each pixel in the training image to obtain the image features, and performs a reduction operation on the image features to generate the specific number of image parameters, and the image parameters are presented in a one-dimensional feature set.

5. The recognition system of claim 4, wherein the reduction operation is to divide the pixels into a plurality of groups, take out an intermediate value of each group as one of the image parameters, or calculate an average pixel value of each group as one of the image parameters.

6. The recognition system of claim 1, wherein the first processor inputs the voice parameters and a training answer into the deep neural network to generate the recognition model, or the first processor inputs the image parameters and the training answer into the deep neural network to generate the recognition model.

7. A recognition method, comprising:
receiving a training voice or a training image;
extracting a plurality of voice features in the training voice, or extracting a plurality of image features in the training image;
wherein when extracting the voice features, generating a specific number of voice parameters according to the voice features, and the voice parameters are input into a deep neural network (DNN) to generate a recognition model;
wherein when extracting the image features, generating the specific number of image parameters according to the image features, and the image parameters are input into the deep neural network to generate the recognition model; and
extracting a plurality of newly added features of the newly added data, selecting the specific number of newly added features as a plurality of new parameters, and substituting the new parameters into the recognition model to recognize the new data and generating a prediction result.

8. The recognition method of claim 7, further comprising:
inputting the voice parameters and a training answer into the deep neural network to generate the recognition model, or inputting the image parameters and the training answer into the deep neural network to generate the recognition model.

9. The recognition method of claim 7, further comprising:
determining whether a recognition rate corresponding to an analysis result output by the deep neural network is greater than an accuracy threshold, and if the first processor determines that the recognition rate corresponding to an analysis result output by the deep neural network is not greater than the accuracy threshold, a gradient descent algorithm is applied to correct a weight value and an offset value in the recognition model.

10. The recognition method of claim 7, further comprising:
performing a Mel-scale Frequency Cepstral Coefficients (MFCC) algorithm to extract the voice features in the training voice, generating the specific number of voice parameters according to the voice features, and presenting the voice parameters in a one-dimensional feature set.

11. The recognition method of claim 7, further comprising:
analyzing each pixel in the training image to obtain the image features, and performing a reduction operation on the image features to generate the specific number of image parameters, and the image parameters are presented in a one-dimensional feature set.

12. The recognition method of claim 11, wherein the reduction operation is to divide the pixels into a plurality of groups, take out an intermediate value of each group as one of the image parameters, or calculate the average pixel value of each group as one of the image parameters.

* * * * *